United States Patent Office 3,803,173
Patented Apr. 9, 1974

3,803,173
3-{3 - [1-(4-HYDROXYPHENYL) - 1 - HYDROXY-PROPYL-(2)-AMINO]-PROPIONYL}-THIOPHENE
Kalus Posselt, Bergen-Enkheim, Germany, assignor to Deutsche Gold- und Silber-Scheideanstalt vormals Roessler, Frankfurt am Main, Germany
No Drawing. Filed Apr. 26, 1971, Ser. No. 137,576
Int. Cl. A61k 27/00; C07d 63/12
U.S. Cl. 260—332.3 C           1 Claim

ABSTRACT OF THE DISCLOSURE

There are prepared compounds of the formula

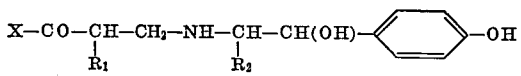

where $R_1$ and $R_2$ are hydrogen or alkyl groups of 1 to 4 carbon atoms and X is a monocyclic or bicyclic aromatic ring system having the formula

where Y is oxygen, sulfur or N—$R_3$ where $R_3$ is hydrogen, lower alkyl, or phenyl, alpha, beta, alpha' and beta' are hydrogen, halogen, lower alkyl, lower alkoxy, or phenyl with the proviso that not more than three substituents are present and wherein alpha and beta together can form a fused benzene ring as well as their pharmaceutically acceptable acid addition salts and quaternary ammonium compounds. The compounds have pharmacological activity, including heart circulatory activity and bronchospasmolytic activity.

---

The present invention is concerned with new heterocyclic aminoketones of the general formula

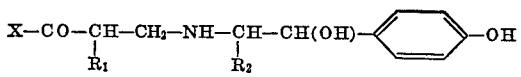   (I)

where $R_1$ and $R_2$ are hydrogen or alkyl of 1 to 4 carbon atoms and X is a monocyclic or bicyclic ring system having an aromatic character which can be substituted by lower alkyl, lower alkoxy, phenyl or halogen and which is derived from a compound having the formula

   (II)

or the corresponding alpha, beta benzo derivatives and wherein Y is oxygen, sulfur or N—$R_3$ where $R_3$ is hydrogen, lower alkyl or phenyl and the optically active isomers or diastereomers as well as their salts with pharmacologically acceptable acids and their quaternary ammonium compounds.

The monocyclic or bicyclic ring system can contain one or several of the above-mentioned substituents in the 5 membered ring or in the fused benzene ring. The substituents can be the same or different. In general, the number of individual substituents in the ring system are not over 3. Preferably the lower alkyl and lower alkoxy groups have 1 to 6 carbon atoms. If $R_1$ and $R_2$ are alkyl, they are preferably methyl. Examples of heterocyclic ring systems include furane, thiophene, pyrrole, benzofurane, thionaphthene and indole.

Particularly preferred compounds have the formula

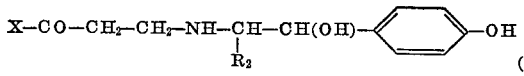   (Ia)

where X is a thiophene, thionaphthene or indole residue which in a given case can have a maximum of two substituents from the group of 1 to 6 carbon atom alkyl groups and 1 or halogen atoms, especially fluorine, chlorine or bromine and $R_2$ is hydrogen or a lower alkyl, preferably methyl.

Examples of compounds of the invention within Formula I are

3-{-[1-(4-hydroxyphenyl)-1-hydroxy-(2)-amino]-propionyl}-2,5-dimethyl furane;
2-{-[1-(4-hydroxyphenyl)-1-hydroxypropyl-(2)-amino]-propionyl}-5-chlorothiophene;
3-{3-[1-(4-hydroxyphenyl)-1-hydroxypropyl-(2)-amino]-propionyl}-2,5-dimethyl thiophene;
2-{3-[1-(4-hydroxyphenyl)-1-hydroxypropyl-(2)-amino]-propionyl}-1-methyl pyrrole;
2-{3-[1-(4-hydroxyphenyl)-1-hydroxypropyl-(2)-amino]-propionyl}-benzofurane;
3-{3-[1-(4-hydroxyphenyl)-1-hydroxypropyl-(2)-amino]-propionyl}-thionaphthene;
3-{3-[1-(4-hydroxyphenyl)-1-hydroxypropyl-(2)-amino]-propionyl}-1-methyl indole;
3-{3-[1-(4-hydroxyphenyl)-1-hydroxypropyl-(2)-amino]-propionyl}-2-bromo thiophene (and the corresponding thionaphthene and indole analogues) i.e. 3-{3-[1-(4-hydroxyphenyl)-1-hydroxypropyl - (2) - amino]-propionyl}-2-bromothionaphthene and 3 - {3-[1-(4-hydroxyphenyl)-1-hydroxypropyl - (2) - amino]-propionyl}-2-bromoindole;
3-{3-[1 - (4 - hydroxyphenyl) - 1 - hydroxypropyl-(2)-amino]-propinoyl}-2,4,5-trimethyl thiophene (and the corresponding furane and pyrrole analogues);
2-{3-[1 - (4 - hydroxyphenyl) - 1 - hydroxypropyl-(2)-amino]-propionyl}-3,4-difluorothiophene (and the corresponding furane and 1-methyl pyrrole analogues);
3-{3 - [1 - (4-hydroxyphenyl) - 1 - hydroxypropyl-(2)-amino]-propionyl} - 1 - phenyl indole (and the corresponding pyrrole analogue);
3-{3 - [1 - (4-hydroxyphenyl) - 1 - hydroxypropyl-(2)-amino]-propionyl-2-phenyl thiophene (and the corresponding thionaphthene, indole, pyrrole, furane and benzofurane analogues);
3-{3 - [1 - (4-hydroxyphenyl) - 1 - hydroxypropyl-(2)-amino]-propionyl 2-methoxythiophene (and the corresponding thionaphthene, 1-methyl indole, pyrrole, furane and benzofurane analogues);
3-{3 - [1 - (4-hydroxyphenyl) - 1 - hydroxypropyl-(2)-amino]-propionyl}-2-ethyl thiophene (and the corresponding furane, benzofurane, pyrrole, 1-ethylindole and thionaphthene analogues);
2-{3 - [1 - (4-hydroxyphenyl) - 1 - hydroxypropyl-(2)-amino]-propionyl}-3-hexyl thiophene (and the corresponding thionaphthene, pyrrole, indole, furane and benzofurane analogues);
3-{3 - [1 - (4-hydroxyphenyl) - 1 - hydroxyethyl-(2)-amino]-propionyl}-thionaphthene (and the corresponding thiophene, 1-methyl pyrrole, 1-propylindole, furane and benzofurane analogues);
3-{3 - [1 - (4-hydroxyphenyl) - 1 - hydroxyethyl-(2)-amino]-propionyl}-2-methyl - 5 - chlorothiophene (and the corresponding furane and 1-methylpyrrole analogues);
3-{3 - [1 - (4-hydroxyphenyl) - 1 - hydroxypropyl-(2)-amino]-2-methylpropionyl}-2-isopropylindole (and the corresponding pyrrole, thiophene, thionaphthene, furane and benzofurane analogues);
2-{3 - [1 - (4-hydroxyphenyl) - 1 - hydroxyhexyl-(2)-amino]-propionyl} - 3 - fluorothiophene and the corresponding thionaphthene, furane, benzofurane, 1-methylpyrrole and indole analogues);
2-{3 - [1 - (4-hydroxyphenyl) - 1 - hydroxypropyl-(2)-amino]-2-butylpropionyl}-1-methyl indole (and the corresponding thiophene, thionaphthene, furane, benzofurane and 1-methylpyrrole analogues);

3-{3 - [1 - (4-hydroxyphenyl) - 1 - hydroxy-propyl-(2)-amino]-propionyl}-2-phenylthionaphthene (and the corresponding thiophene, furane, benzofurane, pyrrole and indole analogues).

The compounds of the invention possess valuable pharmacological and pharmaceutical properties. They especially show good heart circulatory action, as well as bronchospasmolytic properties.

The compounds according to the invention having the above Formula I can be produced in a known manner (e.g. in a manner similar to the compounds prepared in Posselt Pat. 3,514,465) by (a) reacting a compound of the general formula

with a compound of the general formula

in the presence of formaldehyde or a source of formaldehyde or (b) reacting a compound of the general formula

or the corresponding Mannich base of the general formula

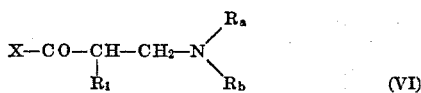

where the groups $R_a$ and $R_b$ are lower alkyl or can be closed together form a ring with a compound of General Formula IV or (c) reacting a compound of the general formula

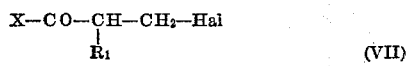

where Hal is chlorine or bromine with a compound of General Formula IV.

The starting compounds corresponding to General Formula VI can be prepared, for example, from the corresponding heterocyclic ketone of General Formula III by reaction of formaldehyde and a dialkylamine salt, e.g. diethylamine hydrochloride.

The starting compounds of Formula V can be obtained, for example, by splitting off the amine portion (for example, by steam distillation) of compounds of Formula VI.

The starting compounds of General Formula VII can be obtained, for example, by the known reaction of heterocyclic compounds of the Formula X (e.g. thiophene, thionaphthene, furance, benzofurane, pyrrole, indole, methyl indole) with beta-chloropropionyl chloride in the presence of a Friedel-Crafts, e.g. aluminum chloride, or by the known addition of a hydrogen halide, e.g. hydrogen chloride to a compound of Formula V.

Process (a) supra is customarily carried out at a temperature between 20° and 150° C. As solvents, there can be used, for example, alcohols, e.g. methyl alcohol and ethyl alcohol, dioxane, glacial acetic acid, etc.

Process (b) is carried out in general by using an unsaturated ketone, e.g. vinyl 2-thienyl ketone, at a temperature between 20 and 80° C. in an inert solvent, for example, ether (diethyl ether), acetone dioxane or chloroform, while in using the corresponding Mannich base which in the reaction intermediately is converted into the compound of General Formula V; the reaction temperature range for the most part is higher, preferably between 80 and 120° C. and as solvents there are employed, for example, water, alcohol-water mixtures or a two phase system such as water-benzene or water-toluene.

Process (c) is carried out, for the most part, at higher temperature in a solvent, such as, for example, alcohols, e.g. propyl alcohols, ethers, e.g. dibutyl ether, dimethylformamide, etc. The reaction is suitably carried out in the presence of a basic material as an acid acceptor. Excess amine can also act as the acid acceptor.

The compounds produced which contain optically active carbon atoms and which, as a rule, are produced as racemates can be resolved into their optically active isomers in the usual manner, for example, with the aid of an optically active acid. However, it is also possible to employ optically active compounds or diastereomers as the starting materials whereby the end product is obtained in the corresponding pure optically active form or diasterometric configuration.

The free bases can be converted into their salts with the usual pharmacologically acceptable acids such as HCl, HBr, $H_2SO_4$, acetic acid, citric acid, succinic acid, maleic acid, fumaric acid, lactic acid, p-toluene sulfonic acid and the like. Those compounds containing basic tertiary nitrogen atoms can be converted to their quaternary salts with the usual pharmacologically acceptable quaternizing agents such as the lower alkyl halides, e.g. methyl bromide and ethyl chloride. The free bases can be recovered from the salts, for example, by treatment with aqueous NaOH. Other salts can be prepared from such free bases.

As already indicated, the compounds of the invention have pharmacological activity and can be used in pharmaceutical compositions. The pharmaceutical compositions or medicaments can contain one or several of the compounds of the invention as well as mixtures thereof with other pharmaceutically active materials. For the production of pharmaceutical preparation, there can be used the usual pharmaceutical carriers and assistants. The medicines can be taken enterally, parenterally, orally or perlingually or in the form of sprays. Dispensing can be carried out in the form of tablets, capsules, pills, dragées, plugs, salves, powders, liquids or aerosols. As liquids, there can be used oily or aqueous solutions or suspensions, emulsions, injectable aqueous or oily solutions or suspensions.

Typical examples of suitable carriers and assistants are given, for example, in Ullmann's "Encyklopadie der Technischen Chemie," vol. 4 (1953), pp. 1 to 39; Journal of Pharmaceutical Sciences, vol. 52 (1963), p. 918 et seq., H. V. Czetsch-Lindenwald, "Hilfsstoffe für Pharmazie und Angrenzende Gebiet" as well as in Pharm. Ind., vol. 2 (1961), p. 72 et seq.

Examples of such carriers and assistants are gelatin, sucrose, pectin, starch, tylose, talcum, lycopodium, silica gel, lactose, cellulose derivatives, stearates, emulsifiers, plant oils, water, pharmaceutically compatible mono or polyhydric alcohols such as ethyl alcohol, glycerine, sorbital, pentaerythritol, ethylene glycol and propylene glycol and polyglycols such as polyethylene glycols as well as derivatives thereof, dimethyl sulfoxide, esters of aliphatic saturated or unsaturated fatty acids, e.g. stearic acid, palmitic acid or oleic acid with mono or polyhydric alcohols such as glycols, e.g. ethylene glycol or propylene glycol, glycerine, diethylene glycol, pentaerythritol, sorbitol, mannitol, etc., which in a given case, can be etherified, benzyl benzoate, dioxolane, glycerine formal, glycol furol, dimethyl acetamide, lactamide lactates, ethyl carbonate, etc.

Furthermore, it is possible to add preserving agents, buffers, taste correctors, antioxidants and complex forms (for example, ethylenediamine, tetraacetic acid) and the like.

As antioxidants, there can be used, for example, sodium meta bisulfite and ascorbic acid, as preserving agents there can be used, for example, sorbic acid and p-hydroxybenzoic acid esters and the like.

When tested on the isolated guinea pig heart according to Langendorff (Pflugers Arch. 61, p. 291 [1895]), it was found that the compounds of the invention had good activity in doses between 5 and 500 μg./heart in dilating the coronaries while simultaneously increasing the contraction strength.

This heart activity is comparable with the activity of the known agent, papaverine.

The indicated uses of the compounds of the invention include:

coronary insufficiency
angina pectoris
myocardial infarction

The compounds of the invention on the isolated tracheal preparation (spiral) of the guinea pig (Castillo, de Beer, J. Pharm. Therap. 90, p. 104 [1947]) showed a weakening or increasing of a histamine spasm and therefore a good bronchospasmolytic activity.

This bronchospasmolytic activity is comparable with the activity of the known agent, papaverine.

As a general dosage range for the bronchospasmolytic activity, there can be used $1.4 \times 10^{-5}$ to $2.8 \times 10^{-7}$ g./ml.

The compounds of the invention are indicated for bronchial asthma
bronchopulmonary illnesses
asthmatic components The compounds of the invention showed a good antiphlogistic activity on the carrageenin edema of the rat paw (Domenjoz and coworkers, Arch. Exp. Pharm. Path. 230, p. 325 [1957]).

This antiphlogistic activity is comparable with the activity of the known agent, salicylamide.

As a general dosage range for the antiphlogistic activity, there can be used 10 to 500 mg./kg. body weight orally (rat).

The compounds of the invention are indicated for chronic polyarthritis
sicknesses of the rheumatic group
post traumatic inflammations
swellings in fractures
thrombophlebitis in any form
bursitis
synovitis
collagenosis The pharmaceutical preparations generally contain 1 to 50% of the active component or components of the invention, the balance being inert materials.

The preferred forms of use in humans (or animals) are tablets which contain between 5 and 100 mg. of active material or solutions, e.g. in water or alcohol which contain between 0.1 to 2.5% of active material.

In individual doses, the amount of the active component of the invention is, for example, dispensed orally in an amount of 20 mg., dispensed intravenously 10 mg., calculated on the free base. These dosages can be dispensed one or several times daily.

For example, it is recommended to use three times daily 1 to 3 tablets containing 20 mg. of active substance or to inject intravenously one to three times daily a 2 ml. ampule containing 10 mg. of active material.

The acute toxicity of the compounds of the invention in the mouse (expressed by the LD 50 mg./kg.) is, for example, in oral application at 1200 mg./kg. (or as the case may be, above 200 mg./kg.).

The compounds of the invention are useful medicines for humans, animals, e.g. dogs, cats, laboratory animals such as guinea pigs, rats, mice and for agricultural purposes.

In the processes of preparing the compounds of the present invention, it is frequently expedient to protect the phenolic hydroxyl group by a protective group. These types of protective groups are easily split off from the end product. Preferably, it is a matter of readily soluble splitable acyl groups. The splitting of such protective groups can be carried out, for example, by saponification with diluted acids, e.g. hydrochloric acid, at room temperature or at higher temperatures. For example, for this type of protective group, there are used aliphatic acyl groups, such as, for example, the acetyl group, the trifluoroacetyl group, etc.

The salts of the present invention, e.g. the hydrochloride can also be used to cure aminoplasts, e.g. melamine-formaldehyde resins.

Unless otherwise indicated, all parts and percentages are by weight.

EXAMPLE 1

2-{3-[1-(4-hydroxyphenyl)-1-hydroxy-propyl-(2)-amino]-propionyl}furane

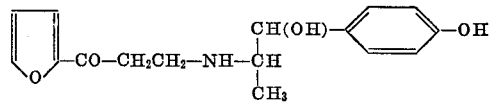

11 grams (0.1 mole) of 2-acetyl furane, 3 grams of paraformaldehyde and 20.5 grams (0.1 mole) of 4-hydroxynorephedrine.HCl were heated at reflux in 50 ml. of isopropanol for 2.5 hours wherein after 1 hour an additional 1.5 grams of paraformaldehyde were added. The solvent was distilled off, the residue extracted several times with ether and dissolved in isopropanol. After standing for several days, the hydrochloride salt of the title compound of the example precipitated out. It was recrystallized from glacial acetic acid. M.P. 169–170° C. Yield 8 grams.

EXAMPLE 2

2-{3-[1-(4-hydroxyphenyl)-1-hydroxy-propyl-(2)-amino]-propionyl}-thiophene

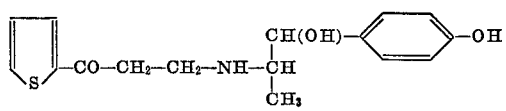

12.6 grams (0.1 mole) of 2-acetyl thiophene, 3 grams of paraformaldehyde and 20.5 grams (0.1 mole) of 4-hydroxynorephedrine.HCl were heated at reflux in 50 ml. of isopropanol for 2.5 hours wherein after 1 hour a further 1.5 grams of paraformaldehyde were added. The solvent was distilled off, the residue dissolved in water and extracted with ether. The hydrochloride salt of the title compound of the example precipitated out after standing for several days and was recrystallized from ethanol. M.P. 188–190° C. Yield 10 grams.

EXAMPLE 3

3-{3-[1-(4-hydroxyphenyl)-1-hydroxypropyl-(2)-amino]-propionyl}-thiophene

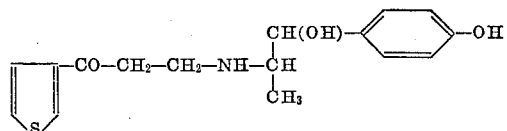

12.6 grams (0.1 mole) of 3-acetyl thiophene, 3 grams of paraformaldehyde and 20.5 grams (0.1 mole) of 4-hydroxy-norephedrine.HCl were heated at reflux in 50 ml. of isopropanol for 2.5 hours wherein after 1 hour a further the 1.5 grams of paraformaldehyde were added. The solvent was distilled off, the residue dissolved in water and extracted with ether. The hydrochloride salt of the title compound of the example precipitated out after standing for several days and was recrystallized from isopropanol. M.P. 182–183° C. Yield 6 grams.

EXAMPLE 4

3-{3-[1-(4-hydroxyphenyl)-1-hydroxypropyl-(2)-amino]-propionyl}-2,5-dimethyl thiophene

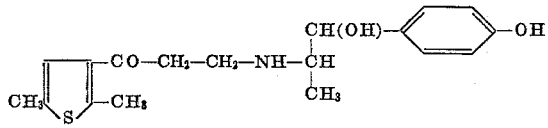

30.8 grams (0.2 mole) of 3-acetyl-2,5-dimethyl thiophene, 6 grams of paraformaldehyde (equivalent to 0.2 mole of formaldehyde) and 40.2 grams (0.2 mole) of 4-hydroxy-norephedrine.HCl were heated at reflux in 150 ml. of isopropanol for 3 hours wherein after 1 hour an additional 3 grams of paraformaldehyde were added. The solvent was distilled off, the residue dissolved in water and extracted with ether. After standing for several days, the hydrochloride salt of the title compound of the example precipitated out. It was recrystallized from ethanol. M.P. 181–183° C. Yield 22 grams.

EXAMPLE 5

2-{3-[1-(4-hydroxyphenyl)-1-hydroxypropyl-(2)-amino]-propionyl}-benzofurane

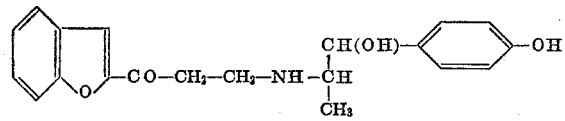

16.0 grams (0.1 mole) of 2-acetyl benzofurane, 3 grams of paraformaldehyde (equivalent to 0.1 mole of formaldehyde) and 20.1 grams (0.1 mole) of 4-hydroxynorephedrine.HCl were heated at reflux in 50 ml. of isopropanol for 3 hours wherein after 1 hour an additional 1.5 grams of paraformaldehyde were added. The solvent was distilled off and the residue treated with acetone. The hydrochloride salt of the title compound of the example which crystallized out was washed with a little water and recrystallized from ethanol. M.P. 180° C. Yield 6 grams.

EXAMPLE 6

3-{-[1-(4-hydroxyphenyl)-1-hydroxypropyl)-(2)-amino]-propionyl}-1-methyl indole

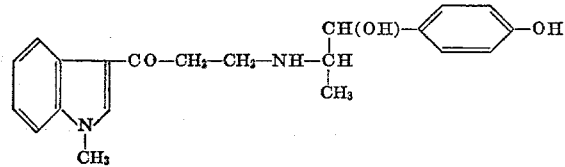

17.3 grams (0.1 mole) of 1-methyl-3-acetyl indole, 3 grams of paraformaldehyde and 20.1 grams (0.1 mole) of 4-hydroxynorephedrine.HCl were heated at reflux in 150 ml. of isopropanol for 3 hours wherein after 1 hour an additional 1.5 grams of paraformaldehyde were added. The hydrochloride salt of the title compound of the example which precipitated out of the reaction solution upon cooling was recrystallized from ethanol. M.P. 218°. Yield 6 grams.

EXAMPLE 7

3-{3-[1-(4-hydroxyphenyl)-1-hydroxypropyl-(2)-amino]-propionyl}-thionaphthene

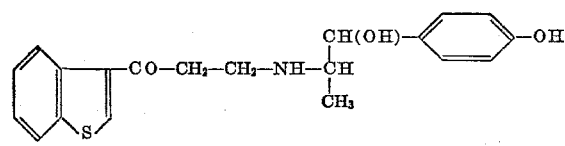

17.6 grams (0.1 mole) of 3-acetyl thionaphthene, 2 grams of paraformaldehyde and 20.1 grams (0.1 mole) of 4-hydroxynorephedrine.HCl were heated at reflux in 150 ml. of isopropanol for 4 hours wherein after 2 hours an additional 1.5 grams of paraformaldehyde were added. The solvent was distilled off and the residue treated successively with ether, water and acetone. The HCl salt of the title compound of the example was then recrystallized from ethanol. M.P. 198° C. Yield 4 grams.

EXAMPLE 8

2-{3-[1-(4-hydroxyphenyl)-1-hydroxypropyl-(2)-amino]-propionyl}-thiophene

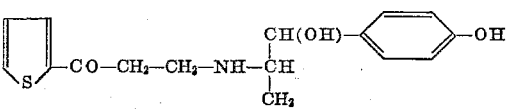

2.2 grams (0.01 mole) of 2-β-dimethylaminopropionyl thiophene.HCl and 1.7 grams of (0.01 mole) of 4-hydroxy-norephedrine were each dissolved in 10 ml. of water and heated together for ½ hour on the water bath. Upon cooling, the free base of the title compound of the example precipitated out. M.P. 115–117° C. It was washed with ether and it was converted in ethanol with ethanolic HCl into the hydrochloride (the compound prepared in Example 2). M.P. 188–190° C. Yield 1 gram.

The 2-β-dimethylaminopropionyl thiophene.HCl (M.P. 178–179° C.) was obtained by reacting equimolar amounts of 2-acetyl thiophene, paraformaldehyde and dimethylamine.HCl in isopropanol at the boiling point.

1.7 grams (0.01 mole) of 4-hydroxynorephedrine were dissolved in 50 ml. of chloroform and treated with a solution of 2.7 grams (0.02 mole) of thienyl-(2)-vinylketone in 10 ml. of chloroform. After standing overnight, the solution was treated with HCl gas. The solvent was distilled off and the residue treated with acetone. The HCl salt which crystallized was recrystallized from ethanol to give the compound produced in Example 2. M.P. 188–190° C. Yield 0.5 gram.

The thienyl-(2)-vinyl ketone was obtained as an oil by passing steam over 2-β-dimethylamino-propionyl thiophene HCl.

5.2 grams (0.03 mole) of 2-β-chloropropionylthiophene were dissolved in 25 ml. of dimethyl formamide and combined with a solution of 5.0 grams (0.03 mole) of 4-hydroxynorephedrine and 4 grams (0.03 mole) of triethylamine in 25 ml. of dimethyl formamide. After 1 hour the triethylamine.HCl was filtered off, the filtrate acidified with isopropanolic HCl, the HCl salt precipitated with ether and recrystallized from ethanol to give the compound produced in Example 2. M.P. 188–190° C. Yield 5 grams.

The 2-β-chloropropionyl thiophene was prepared as an oil by addition of HCl to thienyl-(2)-vinylketone in ether solution at room temperature.

EXAMPLE 9

3-{3-[1-(4-hydroxyphenyl)-1-hydroxy-propyl-(2)-amino]-propionyl}-2,5-dimethyl furane

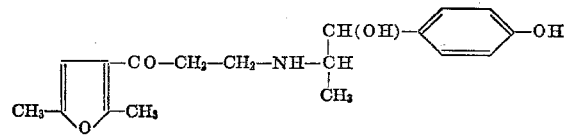

50 grams (0.36 mole) of 3-acetyl-2.5-dimethyl furane, 10 grams of paraformaldehyde (equivalent to 0.33 mole of formaldehyde) and 60.3 grams (0.3 mole) of 4-hydroxynorephedrine.HCl were heated at reflux in a mixture of 400 ml. of isopropanol and 150 ml. of ethanol for 4 hours wherein after 2 hours an additional 10 grams of paraformaldehyde were added. The solvent was distilled off, the residue dissolved in water and extracted with ether. The aqueous phase was distilled off in vacuum, the HCl salt of the title compound of the example remaining behind was crystallized by treatment with ether and recrystallized from isopropanol. M.P. 139° C. Yield 11 grams.

EXAMPLE 10

2-{3-[1-(4-hydroxyphenyl)-1-hydroxypropyl-(2)-amino]-propionyl}-5-chlorothiophene

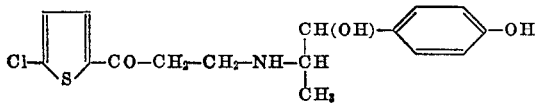

48 grams (0.3 mole) of 2-acetyl-5-chlorothiophene, 9 grams of paraformaldehyde (equivalent to 0.3 mole of formaldehyde) and 60.3 grams (0.3 mole) of 4-hydroxynorephedrine.HCl were heated at reflux in 500 ml. of isopropanol for 5 hours wherein after 2 hours an additional 9 grams of paraformaldehyde were added. The solvent was distilled off, the residue was treated with acetone and the HCl salt of the title compound of the example crystallized out and was recrystallized from isopropanol. M.P. 118° C. (with decomposition). Yield 13 grams.

What is claimed is:
1. 3 - {3 - [1 - (4 - hydroxyphenyl) - 1 - hydroxypropyl-(2)-amino]-propionyl}-thiophene.

References Cited
UNITED STATES PATENTS

| | | | |
|---|---|---|---|
| 3,514,465 | 5/1970 | Posselt et al. | 260—296 |
| 3,644,525 | 2/1972 | Thiele | 260—570.5 |

HENRY R. JILES, Primary Examiner

C. M. S. JAISLE, Assistant Examiner

U.S. Cl. X.R.

260—326.15, 326.5 J, 330.5, 346.2 R, 347.7; 424—274, 275, 285